United States Patent [19]

Okada et al.

[11] Patent Number: 4,725,635

[45] Date of Patent: Feb. 16, 1988

[54] SILICONE-BASED SYNTHETIC FIBER FINISHING AGENT

[75] Inventors: Fumio Okada; Masaki Tanaka; Hiroshi Ohashi, all of Gunma, Japan

[73] Assignee: Shin-Etsu Chemical Co., Ltd., Tokyo, Japan

[21] Appl. No.: 48,695

[22] Filed: May 12, 1987

[30] Foreign Application Priority Data

May 22, 1986 [JP] Japan ................................ 61-118046

[51] Int. Cl.$^4$ .............................................. C08K 5/15
[52] U.S. Cl. .................................... 524/114; 427/387; 428/447; 524/751; 524/753; 528/17; 528/18; 528/19; 528/34
[58] Field of Search ....................... 524/114, 751, 753; 528/34, 17, 18, 19; 427/387; 428/447

[56] References Cited

U.S. PATENT DOCUMENTS 4,018,734  4/1977  Dumoulin ........................... 524/114
4,191,817  3/1980  Schiller et al. ........................ 528/34
4,490,416  12/1984  Westall et al. ........................ 528/34

*Primary Examiner*—Melvyn I. Marquis
*Attorney, Agent, or Firm*—Millen & White

[57] ABSTRACT

The silicone-based fiber finishing agent is particularly suitable for synthetic fiber-made fabric materials such as waddings of polyester fibers to impart excellent softness and smoothness in touch and free from yellowing even by heating with high resistance against dry cleaning. The fiber finishing agent comprises (A) an organopolysiloxane of a substantially linear molecular structure terminated at each molecular chain end with a silanolic hydroxy group or alkoxy group and having at least one amino-substituted hydrocarbon group bonded to the silicon atom in a molecule, (B) an epoxy-containing alkoxy silane compound such as methyl dimethoxy 3-glycidyloxypropyl silane and (C) an epoxy-containing organic compound free from silicon such as glycidyl alcohol and glycidyl methacrylate.

7 Claims, No Drawings

SILICONE-BASED SYNTHETIC FIBER FINISHING AGENT

BACKGROUND OF THE INVENTION

The present invention relates to a silicone-based synthetic fiber finishing agent or, more particularly, to a silicone-based softening agent particularly suitable for the treatment of synthetic fiber-made waddings, which is capable of exhibiting full effects of softening without the disadvantage of yellowing of the treated synthetic fiber material by heat or in the lapse of time.

Waddings of synthetic fibers such as polyester fibers, acrylic fibers and the like are required to have good softness and smoothness of feeling by touching so that they are usually subjected to a softening treatment by using various kinds of fabric finishing agents or softening agents.

The fabric finishing agents for synthetic fibers under practical use include, for example, combinations of an epoxy-containing organopolysiloxane and an amino-containing organopolysiloxane, an epoxy-containing organopolysiloxane and an amino compound and an amino-containing organopolysiloxane and an epoxy compound disclosed in Japanese Patent Publication No. 48-17514, a combination of a high-molecular dimethylpolysiloxane and an amino alkoxy silane disclosed in Japanese Patent Publication No. 51-37996, a combination of an epoxy-containing organopolysiloxane and an amino alkoxy silane disclosed in Japanese Patent Publications Nos. 53-19715 and 53-19716 and the like. These fabric finishing agents are effective in imparting a synthetic fiber-made wadding with softness and smoothness as well as down-like pleasant feeling of touch. A serious problem in these fabric finishing agents is that the fabric material treated therewith is subject to yellowing by the heat in the process of the treatment or in the lapse of time to greatly decrease the commercial value thereof so that it is eagerly desired in the art of fabric finishing to develop a fabric finishing agent free from such a problem or disadvantage.

SUMMARY OF THE INVENTION

Accordingly, the present invention, which has been completed as a result of the extensive investigations undertaken with an object to develop a fabric finishing agent without the disadvantage of discoloration or yellowing of the treated fabric material, provides a novel silicone-based synthetic fiber finishing agent which comprises:

(A) 100 parts by weight of an organopolysiloxane of a substantially linear molecular structure having a viscosity in the range from 100 to 1,000,000 centistokes at 25° C. represented by the general formula $$XO\!-\!(-SiR_2-O-)_m-(-SiZR-O-)_n-X, \qquad (I)$$

in which R is a monovalent, optionally halogen- or cyano-substituted, hydro-carbon group having 1 to 20 carbon atoms, Z is an amino-substituted monovalent hydrocarbon group represented by the general formula $$-R^1-(-NH-CH_2CH_2-)_a-NR^2{}_2, \qquad (II)$$

$R^1$ being a divalent hydrocarbon group having 1 to 10 carbon atoms, $R^2$ being a hydrogen atom or a monovalent hydrocarbon group having 1 to 20 carbon atoms and the subscript a being a positive integer of 1 to 4, X is a hydrogen atom or a monovalent hydrocarbon group having 1 to 10 carbon atoms and the subscripts m and n are each a positive integer with the proviso that the molar ratio of the silicon atoms having the amino-substituted hydrocarbon groups denoted by Z to all of the silicon atoms in a molecule is in the range from 0.01% to 1%;

(B) from 1 to 50 parts by weight of an epoxy-containing alkoxysilane compound; and (C) from 1 to 50 parts by weight of an epoxy-containing organic compound, which is free from silicon.

DETAILED DESCRIPTION OF THE PREFERRED EMBODIMENTS

As is understood from the above given summary of the invention, the essential ingredients in the inventive fabric finishing agent are the components (A), (B) and (C), of which the base ingredient is the component (A). This component is an organopolysiloxane of a substantially linear molecular structure having a specified viscosity and characterized by the amino-substituted hydrocarbon group denoted by the symbol Z and the silanolic hydroxy or alkoxy groups bonded to the terminal silicon atoms. This base ingredient of the composition is combined with two kinds of epoxy-containing compounds of which one is an epoxy-containing alkoxysilane compound and the other is an epoxy-containing organic compound free from silicon.

The organopolysiloxane as the component (A) is represented by the general formula (I) given above, in which each R is a monovalent hydrocarbon group having 1 to 20 carbon atoms exemplified by alkyl groups, e.g. methyl, ethyl, propyl and butyl groups, alkenyl groups, e.g. vinyl and allyl groups, aryl groups, e. g. phenyl and tolyl groups, and cycloalkyl groups, e.g. cyclohexyl group, as well as those substituted groups obtained by replacing a part or all of the hydrogen atoms in the above named hydrocarbon groups with halogen atoms, cyano groups and the like, e.g. chloromethyl, 3,3,3-trifluoropropyl and cyanomethyl groups. The group denoted by Z in the general formula (I) is an amino-substituted monovalent hydrocarbon group represented by the general formula (II) given above, in which $R^1$ is a divalent hydrocarbon group or, in particular, an alkylene group having 1 to 10 carbon atoms such as methylene, ethylene, propylene and butylene groups, $R^2$ is a hydrogen atom or a monovalent hydrocarbon group having 1 to 20 carbon atoms selected from the same class of the groups given above as the examples of the group denoted by R in the general formula (I) and the subscript a is a positive integer of 1 to 4. The group denoted by X in the general formula (I) is a hydrogen atom or a monovalent hydrocarbon group having 1 to 10 carbon atoms selected from the same class of the groups given above as the examples of the group denoted by R in the same general formula (I) so that the organopolysiloxane as the component (A) should be terminated at each molecular chain end with a silanolic hydroxy group or an alkoxy group bonded to the terminal silicon atom. The subscripts m and n are each a positive integer so that the organopolysiloxane as the component (A) should have at least one aminosubstituted monovalent hydrocarbon group denoted by Z in a molecule.

The organopolysiloxane as the component (A) should have a viscosity in the range from 100 to 1,000,000 centistokes or, preferably, from 1000 to 100,000 centistokes at 25° C. When the viscosity thereof is too low, the synthetic fiber-made fabric material treated with the organopolysiloxane composition cannot be imparted with sufficient smoothness. When the viscosity thereof is too large, on the other hand, difficulties may be encountered in the preparation of the fabric finishing agent including the procedure of emulsification of the organopolysiloxane in an aqueous medium or dissolution of the same in an organic solvent.

As is mentioned above, the organopolysiloxane as the component (A) should have at least one amino-substituted monovalent hydrocarbon group denoted by Z in a molecule while an organopolysiloxane having the groups denoted by Z in an excessively large content may sometimes be responsible for the troubles of yellowing in the fabric materials treated with the composition. In this regard, the molar ratio of the silicon atoms each having the amino-substituted group denoted by Z and bonded there to the total number of the silicon atoms in the organopolysiloxane should preferably be in the range from 0.01% to 1.0%. The silanolic hydroxy groups or alkoxy groups bonded to the terminal silicon atoms at the molecular chain ends pertain to the crosslinking reaction with the epoxy-containing alkoxysilane compound as the component (B).

The organopolysiloxane as the component (A) can be prepared, for example, by the following synthetic method. For example, thermal polymerization is conducted in a mixture composed of octamethyl cyclotetrasiloxane, hexamethyl disiloxane and the hydrolysis product of an amino-containing organosilane compound as the source of the siloxane units having the amino-substituted hydrocarbon group, such as methyl dimethoxy 3-aminopropyl silane and methyl dimethoxy 3-[N-(2-aminoethyl)amino]propyl silane, in the presence of a strongly alkaline compound, such as potassium hydroxide, as the catalyst. When an aminoalkyl dialkoxy silane is used in this reaction, the resultant organopolysiloxane is terminated at each molecular chain end with an alkoxy group. When an $\alpha,\omega$-dihydroxy dimethylpolysiloxane is used in the reaction, the resultant organopolysiloxane is terminated with a silanolic hydroxy group at each molecular chain end.

The component (B) comprised in the inventive composition is an epoxy-containing alkoxysilane compound which may be any of organosilane compounds having, in a molecule, an epoxy group and an alkoxy group simultaneously. Such an organosilane compound belongs to a type of the so-called carbon-functional silanes and is used as a surface-treatment agent of various kinds of materials. Exemplary of the epoxy-containing alkoxysilane compound useful as the component (B) are: 3-glycicyloxypropyl trimethoxy silane; 3-glycidyloxypropyl methyl dimethoxy silane; 2-(3,4-epoxy cyclohexyl)ethyl trimethoxy silane; 2-(3,4-epoxy cyclohexyl)ethyl methyl dimethoxy silane; 3-glycidyloxypropyl diethoxy silane; 3-glycidyloxypropyl methyl diethoxy silane; 2-(3,4-epoxy cyclohexyl)ethyl triethoxy silane; 2-(3,4-epoxy cyclohexyl)ethyl methyl diethoxy silane; and the like.

The amount of the epoxy-containing alkoxysilane compound as the component (B) in the inventive composition should be in the range from 1 to 50 parts by weight or, preferably, from 10 to 30 parts by weight per 100 parts by weight of the organopolysiloxane as the component (A). When the amount thereof is too small, no sufficient durability can be obtained in the fiber finishing effect. When the amount thereof is too large, on the other hand, the fabric material of synthetic fibers treated with the composition may give a feeling of stiffness in touch.

The component (C) comprised in the inventive composition is an epoxy-containing organic compound free from silicon. This compound is added to the inventive composition with an object to prevent yellowing of the fabric material treated with the inventive fiber finishing agent due to the amino-containing organic groups in the component (A) as well as to impart the fabric material with improved felling of touch. The compound necessarily has at least one epoxy group in a molecule but should be free from silicon atoms forming an organosilicon group. Exemplary of such an epoxy-containing organic compound are, for example, glycidyl alcohol, glycidyl methacrylate and the like.

The amount of the epoxy-containing organic compound as the component (C) should be in the range from 1 to 50 parts by weight or, preferably, from 10 to 30 parts by weight per 100 parts by weight of the organopolysiloxane as the component (A). When the amount thereof is too small, the above mentioned advantageous effects can hardly be obtained as a matter of course. When the amount thereof is too large, on the other hand, the fabric material treated with the fiber finishing agent is disadvantageously more or less stiffened.

The synthetic fiber finishing agent of the invention can be prepared by uniformly blending the above described components (A), (B) and (C) each in a calculated and weighed amount. If desired in practical applications, the blend may optionally be diluted by adding an organic solvent. Suitable organic solvents include aromatic hydrocarbon solvents, e.g. benzene, toluene and xylene, petroleum-based solvents, e.g. technical-grade naphtha and kerosine, chlorinated hydrocarbon solvents, e.g. trichloroethylene, perchloroethylene and trichloroethane, various kinds of fluorinated hydrocarbon solvents and the like. Alternatively, the blend of the components (A), (B) and (C) may be emulsified in an aqueous medium to give an emulsion by using a suitable surface active agent as the emulsifying agent such as non-ionic surface active agents, e.g. polyoxyethylene alkyl ethers and polyoxyethylene alkyl phenyl ethers, and cationic surface active agents, e.g. quaternary ammonium salts and ethylene oxide adducts of quaternary ammonium salts. Stability of such an aqueous emulsion can be improved according to need when the amino groups in the component (A) are partially neutralized by adding a carboxylic acid such as formic acid, acetic acid, glycolic acid and the like.

It is further optional that the organic solution or aqueous emulsion of the inventive fiber finishing agent is admixed with a salt of an organic acid with a metal such as zinc, titanium, aluminum, tin, zirconium and the like as a catalyst.

Treatment of a fabric material of synthetic fiber with the inventive fiber finishing agent can be performed by any of conventional methods including immersion method, oiling-roller method, spraying method and the like without particular limitations. The amount of the effective ingredients picked up on the fabric material treated with the inventive fiber finishing agent should be in the range from 0.1 to 2.0% by weight or, preferably, from 0.2 to 1.0% by weight based on the untreated fabric material. The fabric material treated with the inventive fiber finishing agent is first dried and then subjected to a heat treatment at a temperature in the range from 100° to 200° C. for a length of time in the range from 1 to 30 minutes so that the effective ingredients therein are crosslinked on and firmly adhere to the fibers to exhibit the desired effect of treatment.

Although the fiber finishing agent of the invention is applicable to any kind of synthetic fibers, particularly satisfactory results can be obtained in the treatment of polyester fibers, acrylic fibers, nylon fibers, polypropylene fibers and the like. While the fabric material of synthetic fiber treated with the inventive fiber finishing agent is imparted with excellent softness and smoothness or so-called feather-like touch, an advantage obtained with the inventive fiber finishing agent is that the treated fabric material is free from discoloration or yellowing by heat or in the lapse of long time.

In the following, the fiber finishing agent of the invention is described in more detail by way of examples, in which the term "parts" always refers to "parts by weight" and the values of viscosity are all those obtained by the measurement at 25° C. The Examples are preceded by the description of the methods and criteria for the evaluation of softness and smoothness, yellowing and dry-cleaning resistance of the fabric material treated with the fiber finishing agent.

Softness and smoothness:

The fabric material treated with the fiber finishing agent was tested by hand touch and feeling was recorded in four ratings according to the criteria below.

A: excellent feather-like feeling of touch
B: good feather-like feeling of touch
C: somewhat rough and stiff feeling with little slipperiness
D: rough and stiff feeling without slipperiness Yellowing:

The fabric material of synthetic fiber treated with the fiber finishing agent was heated at 200° C. for 30 minutes and yellowness thereof was visually inspected and recorded according to the following criteria.

A: absolutely no yellowness
B: substantially without yellowness
C: noticeable yellowness
D: deep yellowness Dry-cleaning resistance: the treated fabric material was washed by using perchloroethylene, an anionic surface active agent and a non-ionic surface active agent according to the method specified in JIS L 0860 "Testing method for dyed color fastness against dry cleaning" and then subjected to the evaluation of the softness and smoothness and yellowing as described above.

EXAMPLE 1

An amino-containing organopolysiloxane was prepared in the following manner. Thus, 6.18 g of an amino-containing dimethoxy silane expressed by the formula $(MeO)_2MeSiA$, Me being a methyl group and A being a 3-[N-(2-aminoethyl)]propyl group of the formula $NH_2CH_2CH_2NH$—$(-CH_2-)_3$—, 4,80 g of a cyclic organopolysiloxane oligomer composed of the difunctional siloxane units of MeASiO as the hydrolysis product of the same silane compound as above with an excess volume of water, 666 g of octamethyl cyclotetrasiloxane and 0.06 g of potassium hydroxide were introduced into a glass-made reaction vessel of 1-liter capacity equipped with a stirrer and a thermometer and the mixture in the vessel was heated and agitated for 6 hours at 150° C. with replacement of the air inside with nitrogen gas. Thereafter, the reaction mixture was admixed with 0.4 g of ethylene chlorohydrin and agitated at 100° C. for additional 1 hour to neutralize the potassium hydroxide.

The reaction mixture was then subjected to stripping of volatile matters by heating at 140° C. under a reduced pressure of 5 mmHg to give an amino-containing organopolysiloxane as the reaction product expressed by the formula

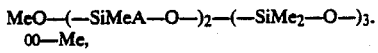

in which A and Me each have the meaning as defined above. This reaction product, which is referred to as the aminosiloxane A hereinbelow, had a viscosity of 2700 centipoise containing 3.5% by weight of volatile matters as determined by heating for 3 hours at 105° C. The amine equivalent of the aminosiloxane A was 640 g/N mole.

An aqueous emulsion was prepared by vigorously agitating 30 parts of the aminosiloxane A and 5 parts of a polyoxyethylene alkyl phenyl ether as a non-ionic surface active agent in 65 parts of water using a high-speed stirrer followed by adjustment of the pH to 5.0 with addition of 2 parts of acetic acid. This aqueous emulsion is referred to as the emulsion A hereinbelow.

A treatment bath for fabric materials, which is referred to as the bath I hereinbelow, was prepared by blending 10 parts of the emulsion A, 1.0 part of 3-glycidyloxypropyl trimethoxy silane (KBM 403, a product by Shin-Etsu Chemical Co.), 1.0 part of glycidyl alcohol and 88 parts of water.

A wadding of polyester staple having a fineness of 6 denier and length of 64 mm was dipped in the bath I followed by centrifugal treatment to remove the extraneous volume of the liquid and a heat treatment at 150° C. for 10 minutes to give a silicone-finished wadding, on which the picked-up amount of the solid matter was 0.1% by weight. The silicone-finished polyester wadding was evaluated for the softness and smoothness and dry-cleaning resistance as well as yellowing by heating at 200° C. for 30 minutes to give the results shown in Table 1 which also shows the results obtained of the same polyester wadding before the treatment.

TABLE 1

|  | Silicone-finished | Before treatment |
| --- | --- | --- |
| Softness and smoothness | A | D |
| Yellowing | A | A |
| Dry-cleaning resistance | B | D |

EXAMPLE 2

An amino-containing organopolysiloxane, which is referred to as the aminosiloxance B hereinbelow, was prepared in substantially the same manner as in the preparation of the aminosiloxane A described above by heating and agitating a mixture composed of 15.2 g of an α,ω-dihydroxy dimethylpolysiloxane of the formula $HO$—$(-SiMe_2-O-)_{10}$—$H$, 724 g of octamethyl cyclotetrasiloxane, 2.34 g of a hydrolysis product of methyl dimethoxy 3-aminopropyl silane and 0.06 g of potassium hydroxide followed by neutralization of the alkali with addition of 0.43 g of ethylene chlorohydrin and removal of low-boiling matters by stripping. The aminosiloxane B, which was expressed by the formula

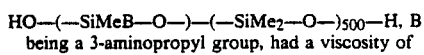

being a 3-aminopropyl group, had a viscosity of 15,300 centipoise and the amine equivalent thereof was 37,000 g/N mole. The aminosiloxane B was emulsified in an aqueous medium in the same manner as in the preparation of the emulsion A in Example 1 to give an aqueous emulsion, which is referred to as the emulsion B hereinbelow.

A treatment bath for fabric materials, which is referred to as the bath II hereinbelow, was prepared by blending 10 parts of the emulsion B, 0.8 part of 2-(3,4-epoxy cyclohexyl)ethyl trimethoxy silane (KBM 303, a product by Shin-Etsu Chemical Co.), 0.8 part of glycidyl alcohol (Glycidol, a product by Dai-cel Co.) and 88.4 parts of water. The same polyester wadding as used in Example 1 was treated with the bath II in the same manner as in Example 1. The thus silicone-finished wadding had excellent softness and smoothness, which was not lost by dry cleaning, and absolutely no yellowing was noted in the wadding by a heat treatment at 200° C. for 30 minutes.

EXAMPLES 3 TO 7 AND COMPARATIVE EXAMPLES 1 TO 4

An amino-containing organopolysiloxane, which is referred to as the aminosiloxane C hereinbelow, was prepared in substantially the same manner as in the preparation of the aminosiloxane B in Example 2 described above except that the starting reaction mixture was composed of 5.3% of the same α,ω-dihydroxy dimethylpolysiloxane, 769 g of octamethyl cyclotetrasiloxane, 4.1 g of the hydrolysis product of methyl dimethoxy 3-aminopropyl silane and 0.07 g of potassium hydroxide and the amount of ethylene chlorohydrin used after completion of the reaction for the neutralization of the alkali catalyst was 0.05 g. The aminosiloxane C, which was expressed by the formula

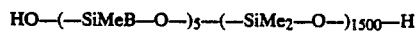
HO—(—SiMeB—O—)$_5$—(—SiMe$_2$—O—)$_{1500}$—H

B being a 3-aminopropyl group, had a viscosity of 73,500 centipoise and contained 4.2% by weight of volatile matters as determined by heating at 105° C. for 3 hours. The aminosiloxane C was emulsified in an aqueous medium in the same manner as in Example 1 to give an aqueous emulsion, which is referred to as the emulsion C hereinbelow.

For comparison, another aqueous emulsion, which is referred to as the emulsion D hereinbelow, was prepared in the following manner. Thus, a mixture of 300 g of octamethyl cyclotetrasiloxane, 10 g of dodecylbenzene sulfonic acid and 690 g of water was vigorously agitated at 60° C. for 16 hours using a high-speed stirrer and the emulsion thus obtained was neutralized to have a pH of 7.0 with addition of a 10% aqueous solution of sodium carbonate. The thus prepared emulsion D, which was an emulsion of a dimethylpolysiloxane terminated at each molecular chain end with a silanolic hydroxy group, contained 27% by weight of non-volatile matters as determined by heating at 105° C. for 3 hours.

Nine treatment baths were prepared in Examples 3 to 7 and Comparative Examples 1 to 4 each by admixing 10 parts of the emulsion A, B, C or D prepared in Examples 1 and 2 and in the above described manner with or, in some formulations, without an epoxy-containing organopolysiloxane KBM 403 (see Example 1), KBM 402 (methyl dimethjoxy 3-glycidyloxypropyl silane, a product by Shin-Etsu Chemical Co.) or KBM 303 (see Example 2), and an amino-containing organosilane compound methyl dimethoxy 3-[N-(2-aminoethyl)]propyl silane (KBM 602, a product by Shin-Etsu Chemical Co.), glycidyl alcohol (Glycidol, supra), glycidyl methacrylate (GMA, a product by Nippon Yushi Co.), an aqueous emulsion of dibutyl tin dilaurate containing 10.0% of the compound and 2.0% of a polyoxyethylene alkyl phenyl ether as the catalyst, and water each in an amount indicated in Table 2 below in parts. The thus prepared treatment baths III to XI in Examples 3 to 7 and Comparative Examples 1 to 4, respectively, were each used for the treatment of the same polyester wadding in the same manner as in Example 1 and the silicone-finished waddings were evaluated to give the results shown in Table 2.

TABLE 2

| Treatment bath | III | IV | V | VI | VII | VIII | IX | X | XI |
|---|---|---|---|---|---|---|---|---|---|
| Emulsion | A | B | C | C | C | C | D | C | C |
| Epoxy-containing silane, parts | | | | | | | | | |
| KBM 403 | 0.5 | — | 0.5 | 0.5 | — | — | — | 1.0 | 0.5 |
| KBM 402 | — | — | — | — | 0.5 | — | — | — | — |
| KBM 303 | — | 1.0 | — | — | — | — | — | — | — |
| Amino-containing silane KBM 602, parts | — | — | — | — | — | 1.0 | 1.0 | — | — |
| Epoxy compound, parts | | | | | | | | | |
| Glycidyl alcohol | 0.5 | 1.0 | 0.5 | — | 0.5 | — | — | — | 0.5 |
| Glycidyl methacrylate | — | — | — | 0.5 | — | — | — | — | — |
| Emulsion of dibutyl tin dilaurate parts | — | — | — | — | — | 1.0 | 1.0 | — | 1.0 |
| Water, parts | 89.0 | 88.0 | 89.0 | 89.0 | 89.0 | 88.0 | 88.0 | 89.0 | 88.0 |
| Softness and smoothness | A | A | A | A | A | B | B | C | C |
| Yellowing | A | A | A | A | A | D | D | A | A |
| Dry-cleaning resistance | B | B | B | B | B | C | B | C | B |

EXAMPLE 8 AND COMPARATIVE EXAMPLE 5

A treatment bath, which is referred to as the bath XII hereinbelow, was prepared by dissolving 20 parts of the aminosiloxane A prepared in Example 1, 0.5 part of the same epoxy-containing alkoxysilane as used in Example 1 (KBM 403, supra) and 0.5 part of glycidyl alcohol (Glycidol, supra) in 97.0 parts of toluene.

For comparison, another treatment bath, which is referred to as the bath XIII hereinbelow, was prepared in the same formulation as above excepting replacement of the aminosiloxane A with the same amount of another amino-containing organopolysiloxane, which is referred to as the aminosiloxane D hereinbelow, expressed by the formula

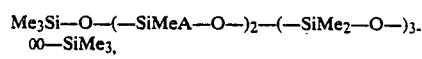
Me$_3$Si—O—(—SiMeA—O—)$_2$—(—SiMe$_2$—O—)$_3$$_{00}$—SiMe$_3$, in which A has the same meaning as defined in Example 1, and prepared in the same manner as in the preparation of the aminosiloxane A from 10.0 g of the hydrolysis product of methyl dimethoxy 3-[N-(2-aminoethyl)]propyl silane, 658 g of octamethyl cyclotetrasiloxane, 4.8 g of hexamethyl disiloxane and 0.05 g of potassium hydroxide as well as 0.04 g of ethylene chlorohydrin as the neutralizing agent.

The same polyester wadding as used in the preceding examples was immersed in the treatment bath XII or XIII followed by a heat treatment at 150° C. for 15 minutes to give silicone-finished waddings which were subjected to the evaluation of softness and smoothness, yellowing and dry-cleaning resistance to give the results shown in Table 3 below.

TABLE 3

| Treatment bath | XII | XIII |
|---|---|---|
| Softness and smoothness | A | A |
| Yellowing | A | A |
| Dry-cleaning resistance | B | C |

What is claimed is:

1. A silicone-based agent for finishing synthetic fibers which comprises:

(A) 100 parts by weight of an organopolysiloxane of a substantially linear molecular structure having a viscosity in the range from 100 to 1,000,000 centistokes at 25° C. represented by the general formula XO—(—SiR$_2$—O—)$_m$—(—SiZR—O—)$_n$—X,

in which R is a monovalent hydrocarbon group or a monovalent hydrocarbon group substituted by halogen atoms having 1 to 20 carbon atoms, Z is an amino-substituted monovalent hydrocarbon group represented by the general formula —R$^1$—(—NH$_2$—CH$_2$—CH—)$_a$—NR$^2$$_2$,

R$^1$ being a divalent hydrocarbon group having 1 to 10 carbon atoms, R$^2$ being a hydrogen atom or a monovalent hydrocarbon group having 1 to 20 carbon atoms and the subscript a being a positive integer of 1 to 4, X is a hydrogen atom or a monovalent hydrocarbon group having 1 to 10 carbon atoms and the subscripts m and n are each a positive integer with the proviso that the molar ratio of the silicon atoms having the amino-substituted hydrocarbon groups denoted by Z to all of the siliconatoms in a molecule is in the range from 0.01% to 1%;

(B) from 1 to 50 parts be weight of an epoxy-containing alkoxy silane compound; and (C) from 1 to 50 parts by weight of an epoxy-containing organic compound, which is free from silicon.

2. The silicone-based agent as claimed in claim 1 wherein the epoxy-containing alkoxy silane compound is selected from the group consisting of methyl dimethoxy 3-glycidyloxypropyl silane, trimethoxy 2-(3,4-epoxycyclohexyl)ethyl silane, methyl dimethoxy 2-(3,4-epoxycyclohexyl)ethyl silane, triethoxy 3-glycidyloxypropyl silane, methyl diethoxy 3-glycidyloxypropyl silane, triethoxy 2-(3,4-epoxycyclohexyl)ethyl silane and methyl diethoxy 2-(3,4-epoxycyclohexyl)ethylsilane.

3. The silicone-based agent as claimed in claim 1 wherein the epoxy-containing organic compound free from silicon as the component (C) is glycidyl alcohol or glycidyl methacrylate.

4. The silicone-based agent as claimed in claim 2 wherein the epoxy-containing organic compound free from silicon as the component (C) is glycidyl alcohol or glycidyl methacrylate.

5. The silicone-based agent as claimed in claim 1 wherein the organopolysiloxane of component (A) has a viscosity of from 1000 to 100,000 centistrokes at 25° C.; wherein R is methyl, ethyl, propyl, butyl, vinyl, allyl, phenyl, tolyl or cyclohexyl or a corresponding group in which at least on hydrogen atom is replaced by a halogen or cyano group; wherein R$^1$ is methylene, ethylene, propylene or butylene; and wherein R$^2$ and X are each a hydrogen atom or R as defined herein.

6. The silicone-based agent as claimed in claim 4 wherein the epoxy-containing alkoxy silane compound is selected from the group consisting of methyl dimethoxy 3-glycidyloxypropyl silane, trimethyloxy 2-(3,4-epoxycyclohexyl)ethyl silane, methyl dimethoxy 2-(3,4-epoxycyclohexyl)ethyl silane, triethoxy 3-glycidyloxypropyl silane, methyl diethoxy 3-glycidyoxypropyl silane, triethoxy 2-(3,4-epoxycyclohexyl)ethyl silane and methyl diethoxy 2-(3,4-epoxycyclohexyl)ethyl silane.

7. The silicone based agent as claimed in claim 5 wherein the epoxy-containing alkoxy silane compound is selected from the group consisting of methyl dimethoxy 3-glycidyloxypropyl silane, trimethyloxy 2-(3,4-epoxycyclohexyl)ethyl silane, methyl dimethoxy 2-(3,4-epoxycyclohexyl)ethyl silane, triethoxy 3-glycidyloxypropyl silane, methyl diethoxy 3-glycidyoxypropyl silane, triethoxy 2-(3,4-epoxycyclohexyl)ethyl silane and methyl diethoxy 2-(3,4-epoxycyclohexyl)ethyl silane.

* * * * *